Nov. 21, 1961 C. W. SINCLAIR 3,009,502
RIM
Filed Oct. 8, 1959 3 Sheets-Sheet 3
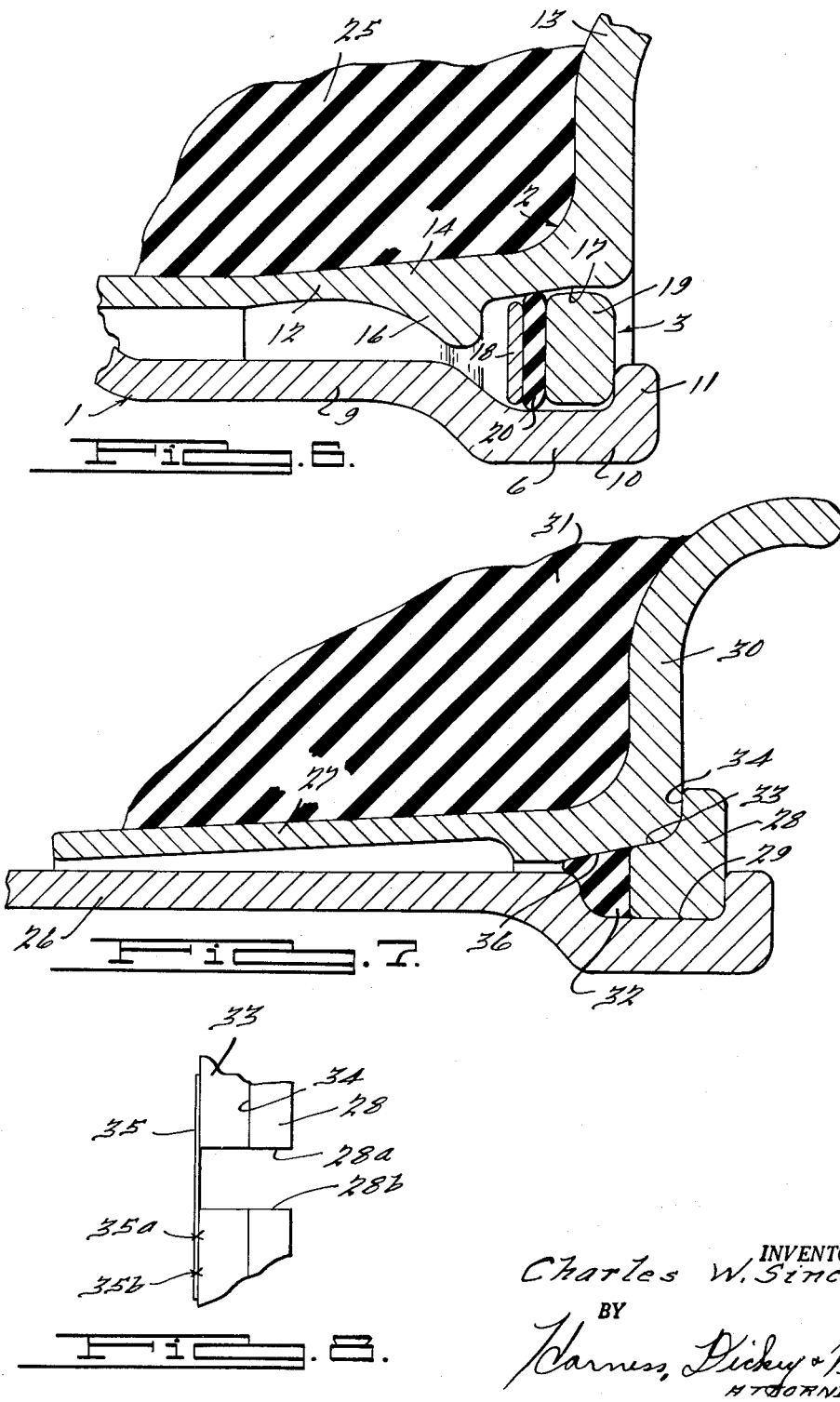
INVENTOR.
Charles W. Sinclair.
BY
Harness, Dickey & Pierce
ATTORNEYS.

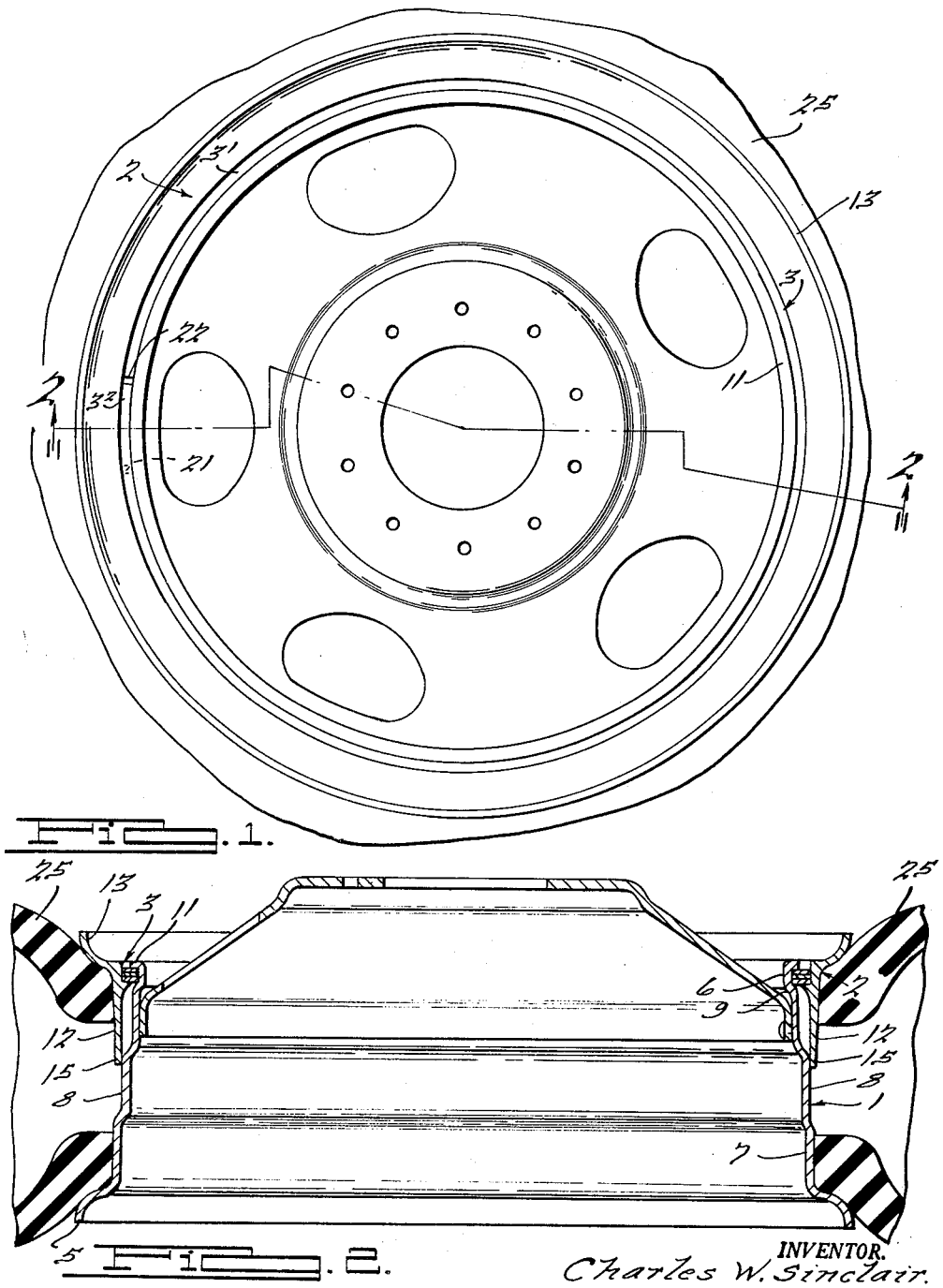

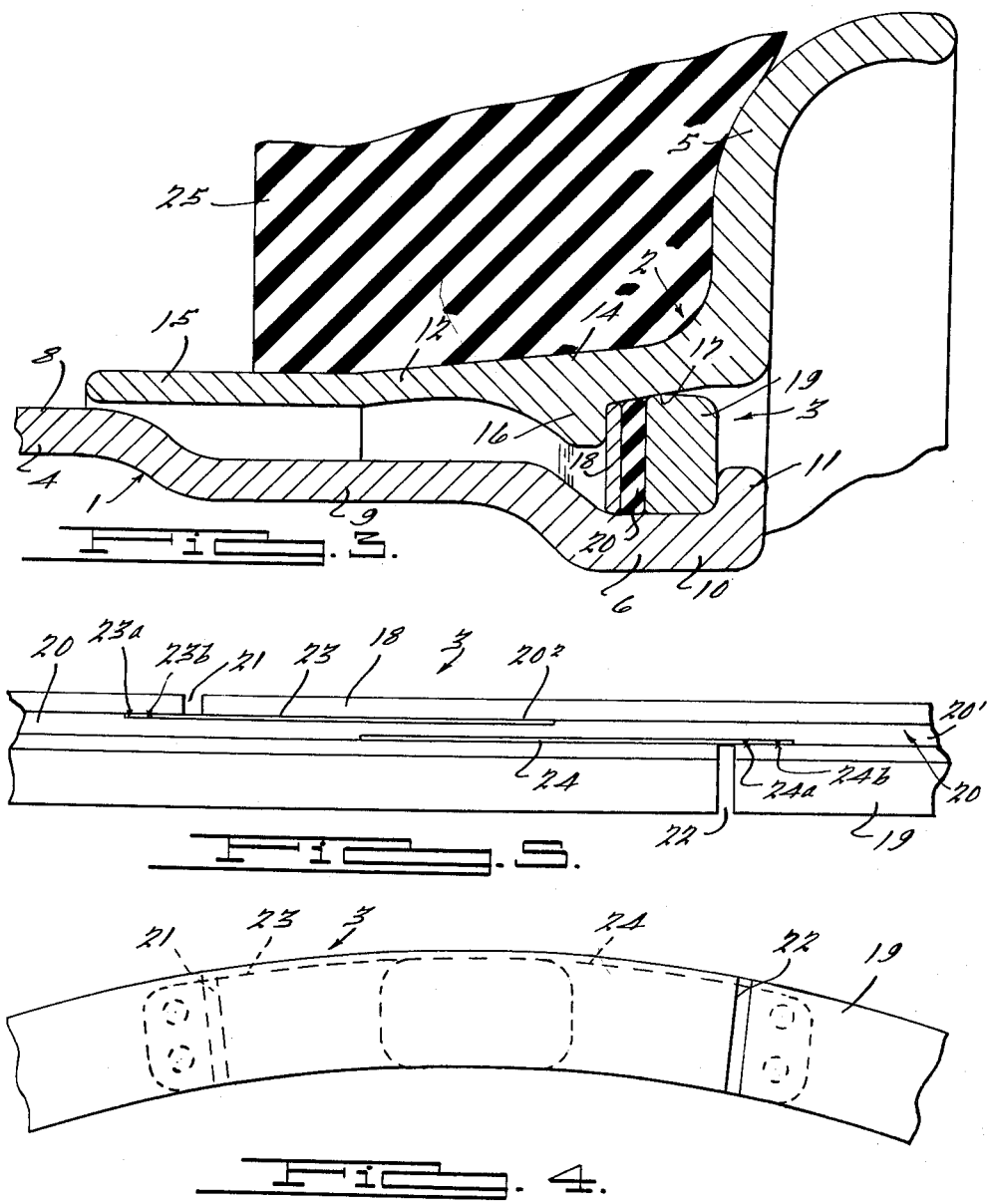

United States Patent Office 3,009,502
Patented Nov. 21, 1961

3,009,502
RIM
Charles W. Sinclair, Detroit, Mich., assignor to Kelsey-Hayes Company, Detroit, Mich., a corporation of Delaware
Filed Oct. 8, 1959, Ser. No. 845,155
2 Claims. (Cl. 152—410)

The invention relates to rims and refers more particularly to rims for pneumatic tubeless tires.

The invention has for one of its objects to provide an improved rim constructed to facilitate mounting and demounting of the tubeless tire and to effectively maintain the air pressure.

The invention has for another object to provide an improved rim comprising an endless annular base member, an endless tire retaining ring member, and a clamping ring member which, in addition to effectively securing the members together when the tubeless tire is inflated effectively maintains the air pressure.

The invention has for another object to provide the rim with air sealing structure including an endless resilient seal and a transversely split clamping member wherein the gap between the spaced ends of the split clamping member is bridged by a shield or the like to prevent the extrusion of the resilient sealing member into the gap.

These and other objects of the invention will become apparent from the following description taken in connection with the accompanying drawings in which:

FIGURE 1 is an elevation of a wheel having a rim embodying the invention;

FIG. 2 is a cross section on the line 2—2 of FIG. 1;

FIG. 3 is an enlarged view of a portion of FIG. 2;

FIG. 4 is an enlarged elevation of a portion of the clamping ring member;

FIG. 5 is a top plan view of FIG. 4;

FIG. 6 is a view similar to FIG. 3 showing the rim members in relative positions occupied during the preliminary assembly;

FIG. 7 is a view of structure similarly illustrated in FIG. 6 showing another form of the invention; and FIG. 8 is a fragmentary plan view of the split clamping ring illustrated in FIG. 7.

The structure disclosed herein includes subject matter which was disclosed but not claimed in my co-pending application, Serial No. 396,403, entitled "Rim," filed December 7, 1953, and now Patent No. 2,910,107, issued October 27, 1959.

The rim is designed for use with pneumatic tubeless tires and, as illustrated, forms part of a motor vehicle wheel. In general, the rim comprises the annular base member 1, the detachable tire retaining ring member 2, and the detachable clamping ring member 3 for retaining the tire retaining ring member on the base member.

The base member 1 is endless and has the annular base 4, the annular tire retaining flange 5 extending generally radially outwardly from one edge of the base, and the annular gutter 6 at the other edge of the base. The base is formed with the annular tire bead seat portion 7 flared toward and connecting into the tire retaining flange 5, the axially extending annular portion 8 leading from the bead seat portion, and the axially extending annular portion 9 between the annular portion 8 and the gutter 6. The annular portion 9 has an external diameter less than that of the annular portion 8. The bottom wall 10 of the gutter extends axially and has an external diameter less than that of the annular portion 9, and the axially outer terminal side wall 11 of the gutter has an external diameter which is preferably slightly less than the external diameter of the annular portion 9. This terminal side wall presents a substantially radial axially inwardly facing surface.

The tire retaining ring member 2 is endless and has the tire bead seat portion 12 and the integral tire retaining flange portion 13 extending generally radially outwardly from the axially outer edge of the tire bead seat portion. The tire bead seat portion is formed with the axially outwardly flared part 14 connecting into the tire retaining flange portion 13 and the axially extending part 15 which latter is adapted to freely encircle the annular portion 8 of the base. The tire retaining ring member has the annular rib 16 which extends radially inwardly from the tire bead seat portion 12 and presents a substantially radial axially outwardly facing shoulder, the internal diameter of the rib being greater than the external diameter of the annular portion 9 of the base so that the rib may freely extend over the last mentioned annular portion. The tire retaining ring also has the radially inner surface 17 which flares axially outwardly from its junction with the rib 16.

The clamping ring member 3 is formed of the expansible transversely split clamping rings 18 and 19 and the endless resilient stretchable sealing ring 20 between the clamping rings. The clamping ring member in the final or completely assembled position of the rim members occupies a position between and engaging the bottom wall 10 of the gutter, the radially inner surface 17 of the tire retaining ring member and the terminal side wall 11 and the rib 16. The clamping rings 18 and 19 have radially outer peripheral bearing surfaces which are flared axially outwardly preferably at the same angle as the radially inner surface 17. The clamping rings carry the radial load between the base member and the tire retaining ring member. The beads of the tubeless tire or casing 25 firmly engage the tire bead seat portion 7 and the part 14 of the tire bead seat portion 12 and prevent the escape of air along these tire bead seat portions. The sealing ring 20 effectively seals the gap between the base member and the tire retaining ring member and maintains the pressure of air within the tubeless tire or casing. The minimum and maximum radial sectional dimensions of the peripheral portions of the clamping rings 18 and 19 for engaging the bottom wall 10 of the gutter and the radially inner surface 17 of the tire retaining ring member are normally greater before assembly of the base, tire retaining ring and clamping ring members than the minimum and maximum radial distances respectively between the portions of the bottom wall and radially inner surface with which these clamping rings are in engagement in the final position of assembly of the base, tire retaining ring and clamping ring members. Also, the inner radial dimension of the clamping rings 18 and 19 is normally greater than the outer radial dimension of the bottom wall of the gutter. As a result, during the assembling of the base, tire retaining ring and clamping ring members, the clamping rings have wedging engagement and are contracted against the bottom wall of the gutter and flex either or both the base and tire retaining ring members.

The clamping rings 18 and 19 have the splits 21 and 22, respectively, spaced circumferentially from each other and forming, in effect, the major portion 3¹ and the minor portion 3² of the clamping ring member at opposite sides of the splits. The sealing ring 20 is preferably formed of rubber and has the major portion 20¹ permanently secured to the portions of the clamping rings forming the major portion 3¹, and the sealing ring also has the minor portion 20² at the other sides of the splits free to stretch circumferentially relative to the portions of the clamping rings forming the minor portion 3². The major portion 20¹ is preferably bonded by a vulcanizing operation to the clamping rings. The minor portion 20² is under tension in the natural or normal state of the clamping ring members before assembly with the base and tire retaining ring members by reason of the resilience of the clamping rings. To prevent the extrusion or distortion of the resilient sealing ring 20 into the gaps formed by the splits 21 and 22, thin shields 23 and 24 are secured to the clamping rings 18 and 19, so as to span the splits 21 and 22 and abut the resilient clamping ring 20. Each of the shields 23 and 24 is secured to the clamping rings 18 and 19, respectively, by being welded or otherwise secured at their one ends to one end of each of said clamping rings adjacent the splits 21 and 22, so that the free opposite ends of the shields 23 and 24 slidably overlie the opposite ends of the clamping rings 18 and 19. The minor distance between the splits 21 and 22 is such that the length of the minor portion $20^2$ of the sealing ring is sufficient to enable this minor portion to stretch sufficiently to enable the clamping rings to be expanded over the terminal side wall 11 when assembling or disassembling the clamping ring member.

The sealing ring 20 in its natural state has rounded or convex radially inner and outer edge portions normally spaced from the adjacent sides of the clamping rings and normally extending radially inwardly and radially outwardly beyond the adjacent peripheral portions of the clamping rings. The inner radial dimension of the sealing ring is normally less than the portion of the bottom wall of the gutter engaged by the sealing ring and the outer radial dimension of the sealing ring is normally greater than the portion of the radially inner surface of the tire retaining ring member engaged by the sealing ring during the latter portion of the assembly of the rim parts. Therefore, during the latter portion of the assembly, the radially inner and radially outer edge portions of the sealing ring are displaced toward each other and fill, or substantially fill, the spaces between the clamping rings and the normal edge portions of the sealing ring.

With this construction of rim, the tubeless tire or casing 25 may be readily mounted on the base member 1 of the rim, at which time the tire retaining ring member 2 and the clamping ring member 3 are removed. The tire retaining ring member may then be readily moved over the base member and inserted within the axially outer bead of the tubeless tire or casing. It will be noted that the construction is such that the radially inner faces of the beads of the tubeless tire or casing may be made to tightly fit the tire bead seat portions 7 and 12 of the base and tire retaining ring members. When the tire retaining ring member is in an axially inward position to clear the clamping ring member, the clamping rings 18 and 19 of the latter may be expanded as permitted by the stretching of the minor portion $20^2$ of the sealing ring 20 and the clamping ring member moved over the terminal side wall 11 of the gutter 6 into the gutter. The tire retaining ring member 2 and the adjacent portion of the side wall of the tubeless tire or casing may then be allowed to move axially outwardly or manually moved axially outwardly to occupy the preliminary inflatable position of assembly, as shown in FIG. 6, at which time the sealing ring 20 is in sealing engagement with both the bottom wall 10 of the gutter and the radially inner surface 17 of the tire retaining ring member and the radially inner and outer peripheral bearing surfaces of the clamping rings are spaced from the bottom wall of the gutter and the radially inner surface of the tire retaining ring member. Air may then be forced into the tubeless tire or casing to inflate the same and the pressure of the inflating air acting through the tubeless tire or casing against the tire retaining ring member assures engagement of the clamping ring 19 with the terminal side wall 11 and moves the tire retaining ring member to its axially outer position over the clamping ring member. During this axially outward movement of the tire retaining ring member, the radially inner surface 17 of the tire retaining ring member rides over the clamping rings contracting and seating the same on the bottom wall of the gutter and producing a wedging action until the axially outwardly facing shoulder formed by the rib 16 abuts the clamping ring 18. By reason of the minor portion $20^2$ of the sealing ring being normally under tension, the relatively small amount of contraction of the clamping rings with the resultant narrowing of the splits does not result in objectionable upsetting of the minor portion. Also, during this axially outward movement, the edge portions of the sealing rings are displaced toward each other and axially to have extended contact with the bottom wall of the gutter and the radially inner surface of the tire retaining ring member.

FIGS. 7 and 8 illustrate another form of the invention wherein an annular rim 26 is illustrated as having an annular continuous gutter 29 adjacent one edge thereof. A detachable tire retaining ring member 27 surrounds the rim adjacent the gutter 29 and is adapted to form a seat for a tire bead 31. An integral tire retaining flange portion 30 is formed on the ring 27 and extends generally radially outwardly for preventing axial displacement of the tire bead relative thereto. Positioned in the gutter 29 are a transversely split annular clamping member 28 and an endless resilient sealing member 32 disposed axially inwardly of the clamping member 28 and abuttable thereagainst.

The tire retaining member 27 is provided with a generally radially inwardly facing surface 36 which is flared axially outwardly and which is engageable with both the resilient seal 32 and a shoulder 33 on the clamping member 28. In addition, a shoulder 34 on the clamping member 28 abuts the outer surface of the flange 30 on the retaining member 27 to limit axially outward movement thereof. Prior to inflation of the tire, the resilient seal 32 extends radially outwardly of the clamping member shoulder 33. However, upon inflation of the tire, air pressure moves the tire retaining member 27 axially outwardly to a position in which the surface 36 thereon abuts the seal 32 and forces it radially inwardly an amount limited by the shoulders 33 and 34. The seal 32 thus binding tightly against the bottom of the gutter 29 and against the surface 36, forms an air-tight seal between the tire retaining member 27 and the rim 26 to prevent the escape of air between said members.

In order to accommodate varying sizes of tire rims 26 and tire retaining members 27 and in order to permit adjustment of the clamping member 28 under varying load conditions, the clamping member 28 is made of a size such that a gap exists at the split thereof which is defined by the spacing between its opposite ends 28a and 28b (FIG. 8). The magnitude of this gap is determined by the size of the rim 26 and tire retaining member 27, within their normal tolerances, as well as by the varying load conditions. Under some conditions, this gap may be relatively large, while under other conditions it may be relatively small. The provision of such a gap in a split clamping ring is well known and certain prior patents have even disclosed such a clamping ring in abutting relationship with an endless resilient seal. However, structures of the latter category have heretofore suffered from the tendency of the resilient seal to extrude through or distort into the gap formed by the split clamping ring and the distortion of the seal is frequently sufficient to permit the gradual escape of air between the tire retaining member and the rim, with the resultant deflation of the tire. In order to overcome this difficulty, yet permit the circumferential adjustment of the clamping member, a relatively thin metal shield 35 is secured to the split clamping member 28 and is made fast thereto adjacent its one end 28b as by being spot welded at 35a and 35b. The opposite end of the shield 35 overlies the side of the clamping member adjacent the end 28a thereof. The shield 35 is disposed on the axially inner side of the clamping member 28 so as to engage the seal 32 on its axially outer side and maintain the seal in alignment. The shield 35 is free to slide at its free end over the one end of the clamping member 28 in order to permit adjustments in size of the clamping member 28. It is desirable that the shield 35 be as thin as possible in order that the axially inner side thereof will lie as closely to the clamping member 28 as possible. However, the shield 35 must be strong enough to resist bowing or other distortion. For this purpose, it has been found that spring steel may be effectively used in the manufacture of the shield 35.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. In mounting structure for a tubeless tire having a rim provided with a gutter adjacent one edge thereof and an annular tire retaining member disposed around said rim, the combination which includes a clamping ring seated in said gutter and engageable with said tire retaining member to prevent movement thereof off of said rim, said clamping member being transversely split to provide opposite ends thereof movable toward and away from one another to permit diametrical adjustment of said clamping ring, and an endless resilient sealing member sealingly engaging said tire retaining member on one side thereof and said rim on another side thereof, said resilient sealing member being disposed axially inwardly of said clamping member and in abutment with said clamping member, and an extension formed on one end of said clamping ring slidably engageable with a side surface of said clamping ring adjacent the opposite end thereof upon diametrical adjustment of said clamping ring, said extension being engageable with said resilient sealing member to prevent movement of said sealing member between the ends of said clamping ring.

2. In mounting structure for a tubeless tire having a rim provided with a gutter adjacent one edge thereof and an annular tire retaining member disposed around said rim, the combination which includes a transversely split clamping ring seated in said gutter and engageable with said tire retaining member to prevent axial movement thereof off of said rim, and an endless resilient sealing member sealingly engaging a radially outer surface on said rim and a radially inner surface on said tire retaining member, said resilient sealing member being disposed axially inwardly of said clamping member and in abutment with said clamping member, and a relatively thin shield fixed to said clamping member adjacent the split thereof and having a free end overlying a side of said clamping member adjacent the opposite end thereof, said shield being engageable with said resilient sealing member to prevent distortion of said sealing member into any gap formed between the ends of said clamping ring.

References Cited in the file of this patent

UNITED STATES PATENTS

| | | |
|---|---|---|
| 1,545,236 | Couchey | July 7, 1925 |
| 2,827,100 | Herzegh | Mar. 18, 1958 |
| 2,894,556 | Darrow | July 14, 1959 |

FOREIGN PATENTS

| | | |
|---|---|---|
| 725,767 | Great Britain | Mar. 9, 1955 |